United States Patent

[11] 3,577,706

| | | | |
|---|---|---|---|
| [72] | Inventor | Leopold Moller<br>Avonmouth, Bristol, England | |
| [21] | Appl. No. | 756,463 | |
| [22] | Filed | Aug. 30, 1968 | |
| [45] | Patented | May 4, 1971 | |
| [73] | Assignee | Imperial Smelting Corporation (N.S.C.)<br>Limited<br>London, England | |
| [32] | Priority | Sept. 20, 1967 | |
| [33] | | Great Britain | |
| [31] | | 42775/67 | |

[54] SULFUR DIOXIDE DRYING
4 Claims, 3 Drawing Figs.

[52] U.S. Cl. .................................................... 55/30,
55/73, 23/178
[51] Int. Cl. ................................................. B01d 53/14

[50] Field of Search............................................. 23/175,
168, 178; 55/73, 30

[56] References Cited
FOREIGN PATENTS
852,073  10/1960  Great Britain................  55/30

Primary Examiner—Reuben Friedman
Assistant Examiner—Charles N. Hart
Attorney—Lane, Aitken, Dunner and Ziems ABSTRACT: In the production of sulfuric acid, a two-stage drying process for drying gas which contains $SO_2$, organic material and water by contact with weak sulfuric acid of less than 70 percent strength to absorb a major proportion of the water but little of the organic material and then by contact with strong sulfuric acid to absorb the remaining water and the organic material.

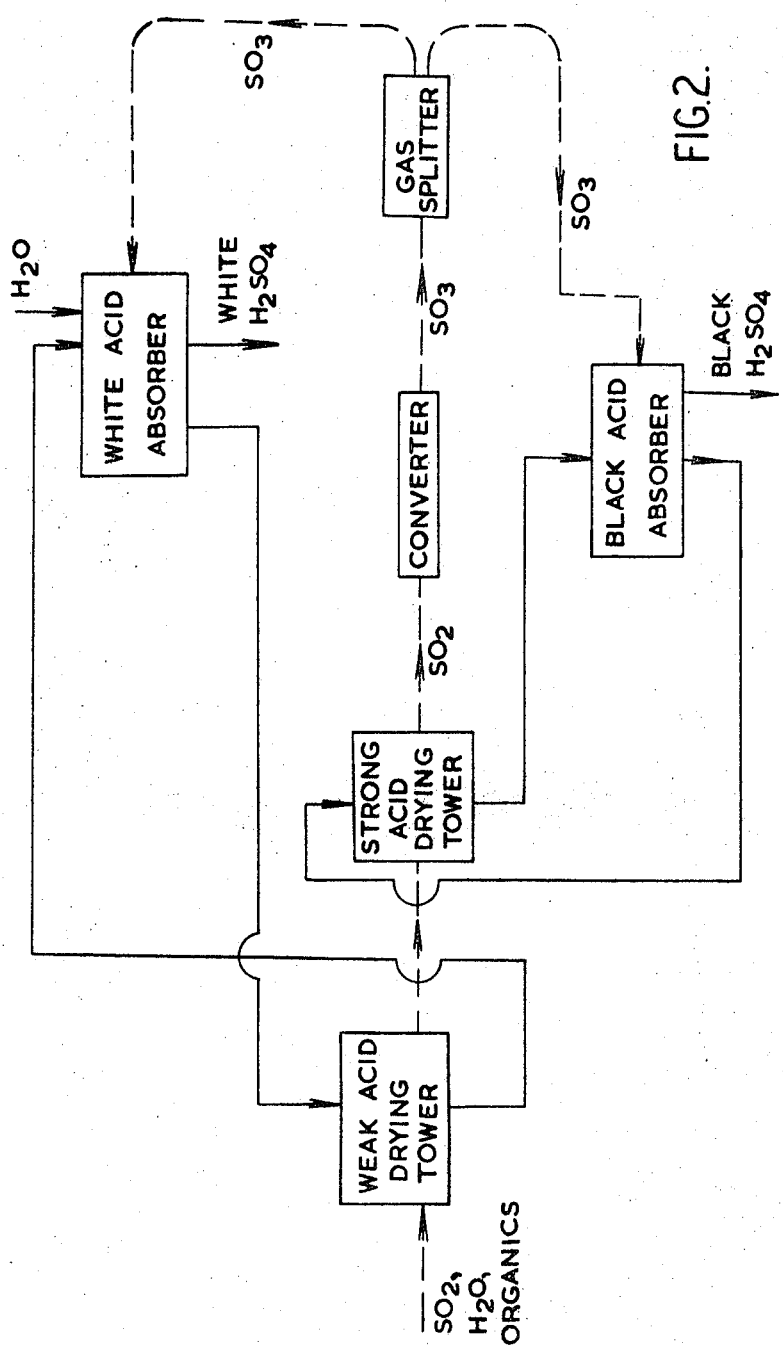

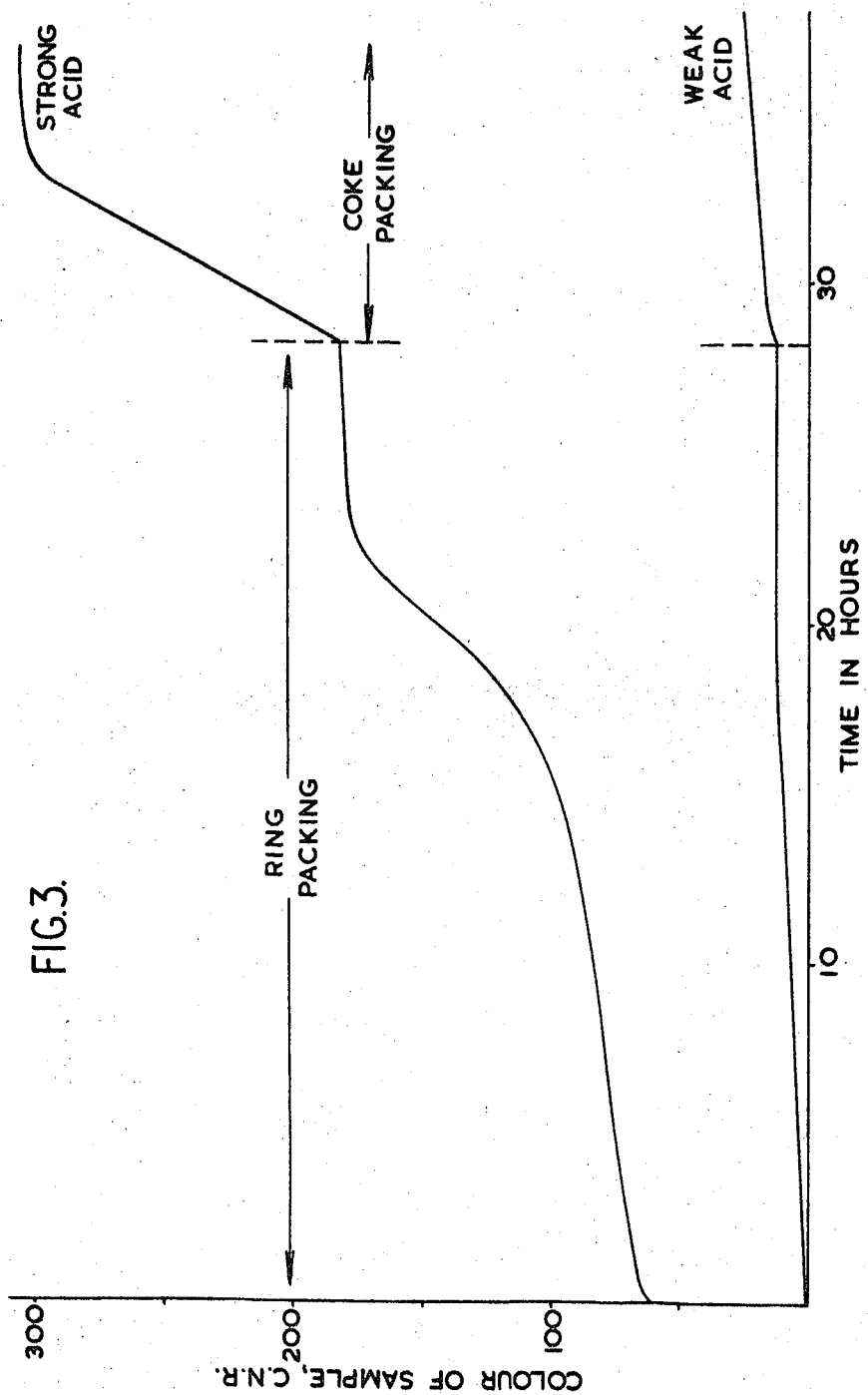

SULFUR DIOXIDE DRYING

This invention relates to the production of sulfuric acid by the contact process using sulfur dioxide-containing gases. More particularly, it relates to the production of sulfuric acid from gases containing sulfur dioxide obtained by the processes of roasting or sintering sulfidic ores as commonly carried out.

The gas containing sulfur dioxide which is obtained by roasting or sintering sulfidic ores, such as zinc blende, galena, pyrites, chalcopyrite, chalcocite, etc., in, for example, a Dwight Lloyd sintering machine, has to be cleaned of both solid impurities (of small enough size to be carried by the gas stream) and of gaseous impurities to make it suitable for use in a conventional catalytic converter to produce sulfur trioxide. One of the gaseous impurities which has to be removed is water unless the so-called wet process is in use.

Hitherto, various methods of removing this water have been proposed. The two most commonly used are to cool the gas and thus cause the water to condense out, or to use a drying agent; commonly these two processes may be used in combination. It is general practice to cool the gas as far as can be economically justified (the determining parameter being the exit temperature of the gas; beyond a given point the cost of cooling ceases to be balanced by improved drying) and then to apply as drying agent aqueous sulfuric acid of such concentration that the gas is dried sufficiently for it to go forward to the catalyst chambers. This treatment of the gas stream with sulfuric acid can be carried out in more than one stage.

The sulfidic ores generally used for roasting and sintering operations are frequently contaminated with a small amount of organic matter resulting from concentration by a flotation process. Further organic material is introduced to the ore during the roasting or sintering by the use of a carbonaceous fuel, frequently fuel oil. It frequently happens that these organic materials are not completely burnt in the sintering or roasting process; therefore the offtake gas containing sulfur dioxide frequently also contains organic carbonaceous compounds. These organic compounds are not generally completely removed by the various purification devices through which the gas is passed prior to the drying stage or stages.

The strength of sulfuric acid is normally expressed as weight percent of $H_2SO_4$ in a given weight of acid. The percentage strength is expressed in this manner throughout the present Specification.

In the drying state or stages referred to above aqueous sulfuric acid containing 75—98 percent of $H_2SO_4$ is commonly used. Sulfuric acid of this strength reacts with the organic matter in the gas stream and becomes discolored, up to an opaque blackness (this discolored acid is hereafter referred to as "black acid"). Since in the process of drying this acid becomes diluted, it is normal practice to return this black acid to the absorbers so that it can be brought back to 97—100 percent sulfuric acid. This is primarily because the weak acid will no longer absorb water sufficiently well to give the desired level of drying.

But this inevitably means that all the acid produced in the absorber to which the black acid is returned will be colored, and of lower commercial value. Thus this formation of black acid represents a serious problem in converting sulfur dioxide derived from a roasting or sintering operation into useful sulfuric acid.

Attempts have been made to reduce the amount of black acid by using a two-stage drying system. In the first drier, acid of 77 percent strength is used, and in the second, acid of 90—98 percent strength is used. Since a smaller quantity of acid is required in the second stage, this can be used to strengthen up the 77 percent acid after use. But only part of the acid (due to the relative amounts used) can be so strengthened, resulting in the removal from the system of black acid of about 75 percent strength. The acid content of the system is maintained by addition of fresh 98—100 percent acid from the absorber system.

There are two disadvantages to this procedure. Firstly, concentration of this acid (by passing it through the absorbers) turns it from brown to black. Secondly, this discolored acid of about 75 percent has only limited uses, and consequently is of less commercial value.

By means of this two-stage drying system it is possible to achieve an output of 60 percent of the input sulfur dioxide as water white 100 percent sulfuric acid, the remaining 40 percent being obtained as black acid.

These problems have previously been discussed in British Pat. Specification No. 852,073. However, in the invention of that Patent Specification, as in the established two-stage stage drying system, the system was designed to remove the organic compounds in the first stage using sulfuric acid of 70—90 percent strength.

It has now surprisingly been discovered that better results can be obtained if weaker sulfuric acid is used in the first stage so that the organic material is not removed but passes through to a second stage where strong acid both removes the organic material and completes the drying. By use of the present invention a yield of water-white sulfuric acid of 80—90 percent of the input sulfur dioxide can be achieved.

The invention provides a two-stage drying process for drying gas containing sulfur dioxide, organic material and water by contact with weak sulfuric acid in a first stage and with strong sulfuric acid in a second stage, wherein the weak sulfuric acid in the first stage is of more than 50 percent but less than 70 percent strength. Normally the weak acid is of 51—69 percent strength, and preferably is of 62—68 percent strength, particularly about 65 percent.

In the second stage the strong acid will be chosen such that substantially all the water remaining after the first stage is removed. Preferably the strong acid is of 90—99 percent strength.

In each of the drying stages water is taken into the sulfuric acid from the gas, and the acid tends to become more dilute. The acid may be returned to or kept at appropriate strength by one of two methods; either oleum (or 98—99.5 percent sulfuric acid) may be added to the diluted acid in appropriate quantities, or the diluted acid may be passed to an absorber where it is mixed with 98—99.5 percent acid and permitted to absorb $SO_3$. In both cases excess acid will be produced beyond that required for recirculation in the drying tower. This excess acid will correspond to the water removed from the gas stream, and will be referred to as the "acid make."

Since in the method of the invention no organic material is taken from the gas in the first stage, the "acid make" from the first stage will all be free of discoloration. The "acid make" from the second stage will be black, but this represents a smaller proportion of the input sulfur dioxide than has hitherto been possible. Instead of 30—50 percent of the available sulfur dioxide being produced as black acid, this can be reduced to 10—20 percent in the present invention. Also, the black acid produced is all strong and can be sold. It is an important advantage that no black acid is produced of about 70 percent strength which has but limited commercial use.

No critical temperature range can be given for the weak sulfuric acid circulating in the first stage drying tower. However, the temperature should be such that a major proportion and preferably 70—90 percent of the water content is removed from the gas in the first stage. It is desirable to have the temperature as low as possible commensurate with consideration of the thermal balance required for economic operation of the sulfuric acid plant. Thus it may be uneconomic to cool the gas excessively in the first stage drying tower. The temperature of the gas when it enters the first stage drying tower and the strength of the circulating acid will be important factors influencing the choice of temperature for the circulating acid. Normally the temperature will be below 90° C., and suitably in the range 20°—60° C., preferably 20°—40° C.

The strength of the acid in the second stage may vary depending on which of the two methods is being used to concentrate the diluted acid from the tower. If the diluted acid is being passed to an absorber to absorb $SO_3$, then it is suitable to use acid of 97—99.5 percent strength in the tower. Since this acid is black, a small absorber unit separate from the main absorbers may be used so that there is no discoloration of the principal acid production. If the diluted acid is being brought up to strength by the addition of oleum or 98—99.5 percent acid, then it is possible to use acid of 90—97 percent, particularly about 94 percent, strength in the second stage tower.

Good contact between gas and liquid in the drying towers is achieved by increasing the liquid surface area, by spreading it out over a support. One support that has been used in the past is coke, or coke breeze. Both of these contain a small but not negligible amount of organic material which the strong acid will leach out. It is therefore preferred when operating the process of the present invention to avoid this additional potential source of black acid by using a packing other than coke in the gas washing towers, for example glass or ceramic packing such as Berl saddles.

Certain aspects of the invention are illustrated in the accompanying drawings in which:

FIG. 2 is a diagrammatic view of an alternative process for the production of sulfuric acid incorporating the method of the invention in a second manner;

FIG. 3 is a graph showing the change in color rating of the acid in the two drying towers.

Figure 1:
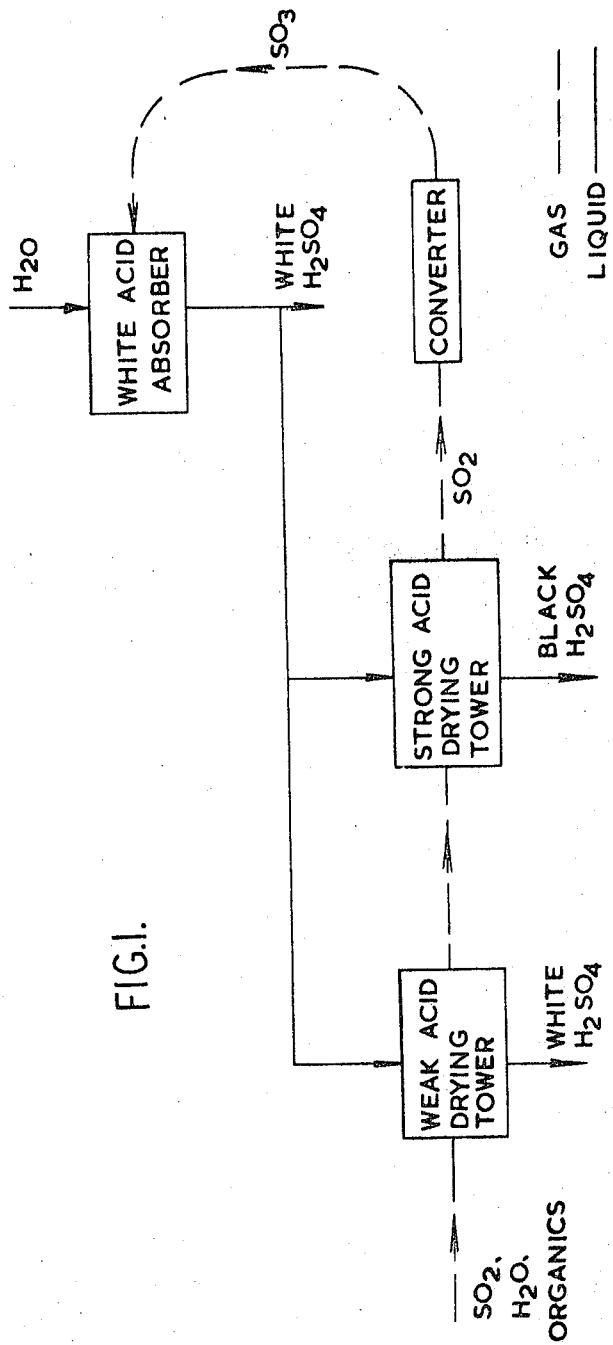
FIG. 1 is a diagrammatic view of a process for the production of sulfuric acid incorporating the method of the invention in one manner.

As shown in FIG. 1, the gas containing $SO_2$, $H_2O$ and organics enters the weak acid drying tower in which acid of more than 50 percent and less than 70 percent strength is circulating. The acid is maintained at a suitably low temperature so that the water vapor pressure over the acid is limited, and most of the water vapor in the gas is absorbed into the acid. However the organic material substantially all remains in the gas stream, which then passes to the strong acid drying tower in which strong acid is circulating. The remaining water and organic materials are removed from the gas stream, which then passes to a catalytic converter for conversion of $SO_2$ into $SO_3$ in the conventional manner. The $SO_3$-containing gas passes to an absorber in which "absorber acid" i.e. sulfuric acid of 98—99.5 percent strength is circulating and $SO_3$ is absorbed in the conventional manner. A fraction of the water-white oleum or 98—99.5 percent sulfuric acid drawn from the absorber is passed back to each of the drying towers to make up the strength of the circulating acid and to increase the strength of the excess "acid make" up to a commercially acceptable level. The acid make from the strong acid drying tower is black, but the acid make from the weak acid drying tower is white.

As shown in FIG. 2, in the alternative process, the gas flow through the two drying towers and the converter is the same as in the process of FIG. 1. After the converter the gas stream containing $SO_3$ is split into two streams. The major proportion of the gas passes to a white acid absorber where the $SO_3$ is absorbed by white 98—99.5 percent acid in the conventional manner. Oleum or 98—99.5 percent acid drawn from the absorber is passed to the weak acid drying tower to make up the strength of the circulating acid and diluted acid from the tower is returned to the absorber to be used with input water for diluting the absorber acid.

A minor proportion of the gas stream passes to a separate absorber, shown as the black acid absorber, again operating in the conventional manner. Diluted acid from the strong acid drying tower is coming into this absorber and bringing the organic materials which cause discoloration. Oleum or 98—99.5 percent acid from the absorber is passed back to the strong acid drying tower to make up the strength. There is thus a "closed circuit" for the discolored black acid. It is possible that the proportion of $SO_3$-containing gas directed to the black acid absorber may be controlled to exactly correspond to the water absorbed from the gas stream in the second stage tower, and this will result in the minimum black acid "make" from this black acid absorber. If a slight excess of $SO_3$ is supplied, then some water is added at the black acid absorber and the black acid "make" is slightly above the theoretical minimum.

FIG. 3 is based on a measurement of color of acid samples. This measurement is purely arbitrary, and merely gives a scale whereby comparison can be achieved. The method is based upon the U.S. Federal Specification for Sulfuric Acid, number 0-S-801, as modified by E.I. DuPont de Nemours and Co. Acid color is determined colorimetrically by comparison with standards containing known amounts of freshly precipitated copper sulfide in water containing free hydrogen sulfide. The results are valid only when freshly prepared standards are used.

Reagents:
 Standard copper sulfate solution, containing 0.01 mg. of Cu per ml.
 Hydrochloric acid, 0.1 normal
 Water freshly saturated with hydrogen sulfide gas Apparatus:
 Nessler tubes, 50 ml. capacity (tall form, of about 30 cm. length and about 2 cm. diameter), and a standard comparator.

Method:
 Transfer sufficient acid sample to one tube to bring up to the mark. To a similar tube add: 30 ml. distilled water, 1 ml. of 0.1 N hydrochloric acid, and 5 ml. of water saturated with hydrogen sulfide. By means of a burette, standard copper solution is then added, with mixing, to this second tube, until, to the nearest 0.5 ml. a color match is obtained.

Results:
 This titration, in ml. is defined for the purpose of this Specification as the Color Numerical Rating, or CNR.

Limitations:
 1. Turbid solutions should be clarified, preferably by centrifuging, before test.
 2. A true color comparison is only obtainable for a CNR below about 20, due to change in color tone of the acid. Thus very colored acid must be diluted; the accuracy of the result below 20 is about ±0.5, and for diluted acids seems to be given by: water, mls., added per ml. acid: n.

$$\text{Accuracy}: \pm \frac{n+1}{4}$$

Thus a CNR of 300 has an accuracy of about ±6.

Acceptable Color Level:
 Any 98.5—100 percent acid with a CNR of less than 30 is taken to be industrially acceptable.
 So-called "black-acid" has a CNR of about 375—400; electrolyte grade acid should be below 12.
 But it is to be stressed that this is a purely arbitrary number, and is in no way a quantitative assessment of the carbon, or other, colorants in the acid.

FIG. 3 shows a plot of CNR against time for a weak acid sample and a strong acid sample, with ceramic ring packing for the first 28 hours and coke packing thereafter.

Experiments with Acid Samples.

i. A test was run on a small scale simulating two standard drying towers in series; the towers were packed with ceramic rings. Through the first tower was circulated 65 percent acid, and through the second was circulated 94 percent acid.

The acid strength was maintained by addition of "water white"(i.e. CNR in range 5—10) 98 percent acid. Samples were taken every 2½ hours to determine CNR values: as shown in FIG. 3 this rose steadily and then attained equilibrium. For the 65 percent acid this equilibrium is at a value of CNR = 14. Replacement of the rings by coke packing caused a second, quicker, rise to what appeared to be a second equilibrium, at CNR = 35. The acid obtained with a CNR = 14 from the ring packing was concentrated to 98 percent by the absorption of further sulfur trioxide; the color level then rose to about CNR = 27. Acid of this color level is commercially acceptable.

For the 94 percent acid, this equilibrium is at a value of about CNR = 180. Replacement of the rings by coke caused a transient drop—probably an absorption effect—but gave a final equilibrium figure of CNR = 305.

Thus it is seen that the color of the weaker acid, on concentration, is acceptable, provided that all steps to avoid organic contamination are avoided.

If conventional coke packed towers are used, then a marked improvement of color is still obtained.

ii. The quantity of clean acid vs. brown acid is a somewhat complex function, since it depends upon a large number of process variables; in particular the gas ($SO_2$) inlet temperature, the $SO_2$ gas strength, the temperature of the acid in the drying tower, the gas flow, and the dioxide to trioxide conversion efficiency are just some.

If:
  i. Inlet gas temperature to 65 percent acid drying tower is 32° C.
  ii. Circulating temperature of 65 percent acid is 40° C.
  iii. Input wet gas contains 6.5 percent sulfur dioxide.
  iv. Gas flow: equivalent to 5,200 cubic feet (147 cu.m) per min. at N.T.P.
  v. Converter conversion efficiency is 100 percent.

Then:
  1. Of the water in the gas, 84.5 percent will be removed in the first tower, the remainder in the second tower. It is therefore inevitable that 84.5 percent of the "acid make" from the drying towers will be white, the remainder colored.
  2. Base on its equivalent as 100 percent acid:

a. "Make" from the drying towers: 45 tons (45.7 metric tons) per day. If the 65 percent acid is put through a white absorber, and the remainder through a black absorber:
  Clean acid "make": 38 tons (38.6 metric tons)
  black acid "make": 7 tons (7.1 metric tons).
  b. Total acid production will be 59.3 tons (60.25 metric tons) per day. Therefore in this case the black acid production corresponds to approximately 12 percent.

I claim:

1. In a two-stage drying process for drying gases containing sulfur dioxide, organic material and water resulting from heating sulfur containing materials wherein the improvement comprises contacting the gases with weak sulfuric acid containing from 50 to 70 percent $H_2SO_4$ by weight in a first stage whereby water is removed from the gases leaving the organic material unaffected and thereafter contacting the gases with strong sulfuric acid containing from 90 to 99.5 percent $H_2SO_4$ by weight to remove organic materials from the gases in a second stage.

2. A process according to claim 1 wherein the strong acid in the second stage is of 90—99.5 percent strength.

3. A process according to claim 1 wherein the weak acid in the first stage is of 62—68 percent strength.

4. A process according to claim 3 wherein the weak acid is of approximately 65 percent strength.